ns patent Office 3,302,905
Patented Feb. 7, 1967

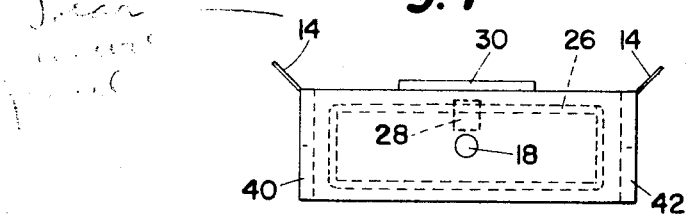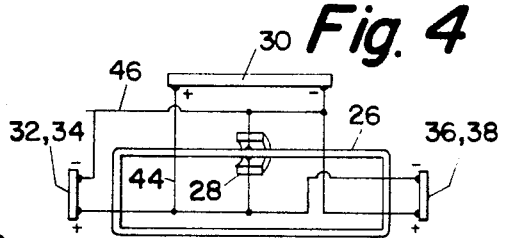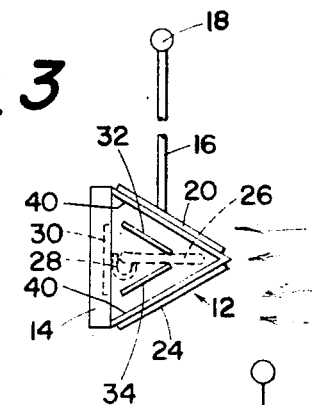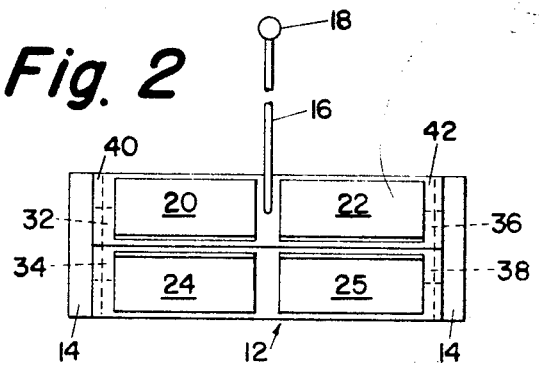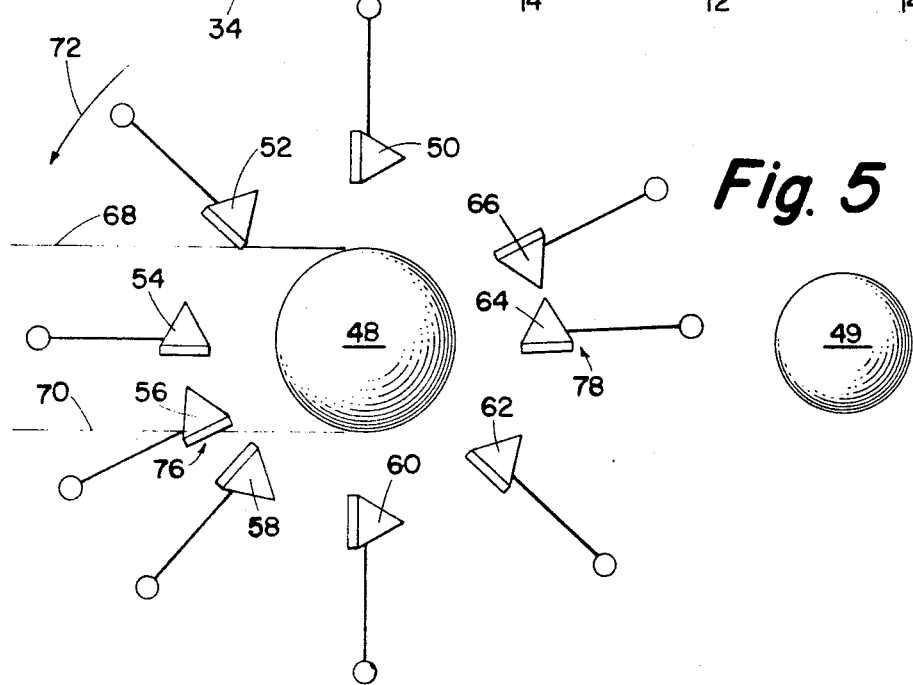

3,302,905
STABILIZED SATELLITE
Louis K. Davis, Phoenixville, and Lamar E. Wagner, Rosemont, Pa., assignors to General Electric Company, a corporation of New York
Filed Aug. 6, 1964, Ser. No. 387,882
4 Claims. (Cl. 244—1)

This invention pertains to the art of stabilizing space satellites, and more particularly to the art of stabilizing earth satellites with respect both to the local vertical and to the sun.

It is known in the art to stabilize a satellite of a parent body with respect to the local vertical, or gradient of gravity, by so designing the vehicle that its moment of inertia around a particular axis is much less than that around any other axis. This is usually accomplished by providing the satellite with one or more long extensions known as gravity-gradient rods. A single rod will, if sufficiently long, create an axis around which the whole satellite's moment of inertia is much less than that around any other axis not aligned with the rod. The satellite will then tend to move with the rod aligned with the local vertical. Such stabilization around a single yaw axis will leave the satellite free to rotate around that axis. Since it is frequently desirable to provide power for equipment in the satellite by the use of converters of solar energy to electricity, such as photovoltaic solar batteries, mounted on the satellite, random yawing around the vertical axis is undesirable because it results in maximum exposure of the absorbing surfaces of the cells to the sun for only part of the time, while during the remainder of the rotation the cells are exposed to the sun only obliquely or not at all. It is thus desirable not only to prevent random yawing, but to orient the satellite around the yaw axis in such a fashion that the photovoltaic or other solar batteries are always facing the sun, except for the time of the satellite's passage through the shadow of the earth.

Since the ambient radiation from the sun exerts a small but detectable pressure upon surfaces on which it impinges, it is also known in the art to provide satellites with outer surfaces so shaped that, when the satellite is in a desired orientation with respect to the sun, the center of radiation pressure lies behind the center of mass of the satellite. If a satellite so equipped is displaced slightly from its stable orientation toward the sun, there will result a torque which tends to restore the satellite to its stable attitude. However, such a satellite, having a moment of inertia and being subject to such restoring torques, is an oscillatory system and tends, if slightly displaced from its stable attitude, to oscillate for long periods of time.

In a copending application by one of us, L. K. Davis, for U.S. patent, entitled "Oscillation Damping System," Serial No. 376,119, filed June 18, 1964, now Patent No. 3,226,062, there is disclosed the use of a flywheel operated by solar batteries for the purpose of damping oscillations in solar-pressure stabilized systems. A momentum storage means, which is preferably a fluid flywheel, is driven by a reversible pump which is furnished energy by auxiliary solar batteries. At least two such batteries are so connected to the pump that illumination of one or the other of the batteries will cause the fluid in the flywheel to circulate in one or the other direction. The solar batteries are so shaded that, when the satellite rotates slightly from its stable orientation toward the sun, that solar battery will be illuminated which tends to drive the fluid flywheel in the proper direction to cancel the rotation. It is further shown in the referenced application that such action results ultimately in a transfer of the momentum stored in the system to the solar photons.

We have invented a satellite in which the local gravity gradient is employed to orient the satellite around its roll and pitch axes; solar pressure acts to provide restoring torques tending to orient it in yaw, toward the sun; and a fluid flywheel is employed to orient it rapidly in yaw toward the sun, any angular momentum acquired by the flywheel being automatically transferred to the solar photons. However, if the satellite passes between the sun and the earth, i.e., if the sun appears at zenith with respect to the satellite, the satellite must rotate rapidly half a turn, or two quadrants, in yaw in order to face the sun again. Since a solar pressure torques acting alone are slow in their action, and since the radiation sensors which control the flywheel sense deviations only up to a quadrant, and hence will be inoperative when the sun is behind the satellite, some additional means are necessary to rotate the satellite rapidly in yaw to cause it to face the sun at least within a quadrant, so that the radiation sensors previously described may again function. To cause such rotation to occur rapidly by means requiring a minimum of additional equipment, we provide on the back of the satellite, that is, the part intended to face away from the sun, a back solar battery which is connected to the fluid flywheel in such fashion that illumination of the back battery will drive the flywheel and cause the satellite to rotate rapidly. When the satellite has rotated by approximately a quarter turn, the back battery will move into shade, and the regular solar batteries will come into action, in cooperation with the solar pressure surfaces on the front of the satellite. The satellite will thus face the sun with a much smaller delay than would result from reliance on solar pressure alone. Since it is immaterial in which direction the satellite makes its half turn, only one back battery is required, since the half turn may always be made in the same direction. Since yawing does not (except for small gyroscopic effects) alter the orientation toward, sensors or antennas oriented toward earth will not be disturbed by such rapid rotation.

Thus, we have provided a satellite oriented in yaw with respect to the sun by simple and reliable means and adapted to accommodate itself rapidly to changes in the sun's bearing; and oriented in roll and pitch by other simple passive means. To damp oscillations in roll and pitch we further employ, in our preferred embodiment, a viscous fluid damper which is the subject of an application for United States patent Serial No. 362,216, filed April 24, 1964, entitled "Motion Damper," by one of us, L. K. Davis, which application is assigned to the assignee of the present application. This damper, which is described in detail in the referenced application, comprises a spherical housing within which there is suspended freely by diamagnetic repulsion a sphere containing a magnet whose field interacts with the local ambient magnetic field to restrain the free motion of the sphere relative to the local ambient field. Means are provided for damping relative motion between the housing and the sphere.

It will be evident to those skilled in the art that all the components employed in our preferred embodiment are of indefinitely long life, and of great simplicity of construction, so that the resulting embodiment will itself be of indefinitely long life and thus highly reliable. This consideration is of great importance in a device which, once placed in orbit, is either completely inaccessible for repair, or can be repaired only with great difficulty and expense. Furthermore, by providing great reliability by simple means, we achieve economy of weight both in the simplicity and small mass of the elements themselves, and in avoiding the necessity of duplicating equipment in order to achieve high reliability. All these objects will be recognized as useful and desirable by those skilled in the art, who will also recognize, in the course of the following description and explanation, other desirable objects which we achieve.

For the better understanding and explanation of our invention, we have provided figures of drawing in which:

FIG. 1 represents schematically and partly cut away a plan view of an embodiment of our invention;

FIG. 2 represents an elevation of the embodiment of FIG. 1;

FIG. 3 represents a profile of the embodiment of FIG. 1;

FIG. 4 represents schematically the interconnection of the solar batteries to the pump driving the fluid flywheel;

FIG. 5 represents embodiments like that represented in FIG. 1, in various locations in an orbit around the earth.

Since FIGS. 1, 2 and 3 are schematic representations of the same structure from different positions, the description of all three will be conducted together. A satellite body 12, shaped like a wedge or a triangular cylinder, is provided with solar pressure panels 14, inclined backward away from the edge of the wedge. An extensible structure, or "rod" 16, extends from the body 12 of the satellite to a viscous damper 18. Main solar batteries 20, 22, 24 and 25 are mounted on the two faces of the wedge-shaped body 12, but are represented only in FIGS. 2 and 3; they have been omitted from FIG. 1 to show more clearly the location of fluid flywheel 26 and its pump 28. Back solar cell 30 appears in FIG. 1 and dotted in FIG. 3. The solar batteries which drive the fluid flywheel 26 through the pump 28, which will be called simply "solar batteries," are represented at 32 and 34, and at 36 and 38. Solar batteries 32 and 34 are connected in parallel, and are functionally identical; there are two, oriented at an angle with respect to each other, simply to assure that there will always be a battery surface turned toward the sun regardless of the sun's elevation. Similarly, batteries 36 and 38 are connected in parallel and are functionally identical. Batteries 32 and 34 are shaded by an overhang 40 of body 12, and batteries 36 and 38 are shaded by an overhang 42 of body 12. These overhangs or shades 40 and 42 project out just far enough to keep the sun illumination from reaching any of batteries 32, 34 or 36, 38 when the sun falls directly normal to the breadth of the satellite—that is, vertically upward in FIG. 1.

The manner of connection of the solar batteries 32, 34 and 36, 38 and the back solar battery 30 with the pump 28 of the fluid flywheel 26 is represented in FIG. 4. The polarity of the patentials produced by the various solar batteries when iluminated is indicated in the figure. It may be observed that the positive termial of batteries 32, 34, the positive terminal of back battery 30, and the negative terminal of batteries 36, 38 are connected by conductor 44 to one terminal of pump 28; and the negative terminal of batteries 32, 34, the negative terminal of back battery 30, and the positive terminal of batteries 36, 38 are connected by conductor 46 to the other terminal of pump 28. Thus, if either back battery 30 or batteries 32, 34 are illuminated, conductor 44 will be positive with respect to conductor 46, and current will flow through pump 28 in a first direction, causing the fluid in flywheel 26 to move in a first direction; but if batteries 36, 38 are illuminated, conductor 44 will be negative with respect to conductor 46, and current will flow through pump 28 in a second direction, causing the fluid in flywheel 26 to move in a second direction, opposite to the first direction. It is a characteristic of conventional photovoltaic batteries that, when not illuminated, they present a high resistance to the flow of current through them, and consequently a darkened battery will *not* act as a short circuit. It may be seen that the polarity of back solar battery 30 is not critical, but it does determine in which direction the satellite, when the sun strikes it from the rear, will turn to face the sun. Since back battery 30 is in fact located in the back of the satellite, if it is poled like batteries 32, 34, it will, when illuminated, cause the satellite to turn in the same direction as batteries 32, 34 cause the satellite to turn when they are illuminated.

Such rotation will cause batteries 32, 34 to move into the sun, with simultaneous movement of back battery 30 into shade. Thereupon, the combination of solar batteries 32, 34 and 36, 38 with the pump 28 and the fluid flywheel 26 will act to damp the yaw oscilations of the satellite about the stable orientation toward the sun to which solar panels 14 tend to cause it to move. This action is described in detail in the application "Oscilation Damping System" of Davis, to which reference has already been made and to which attention is directed for such detailed explanation. Since damper 18 acts to damp rotational oscillations in any direction, it, too, will contribute some damping action.

FIG. 5 represents satellites like the embodiment described in connection with FIGS. 1, 2, 3 and 4, located in various positions in an orbit around the earth or other parent body. Specifically, there are represented the earth 48, the sun 49, and satellites evenly numbered from 50 through 66, inclusive. The boundary between the portions of space illuminated by the sun 49 and the shadow of the earth 48 is marked by two lines 68 and 70, which are represented simply as parallel lines, since the penumbra is not separately represented and the difference between the sun's actual rays as seen in the vicinity of the earth and truly parallel rays is too slight to appear in a figure of the present scale. Considering first satellite 50, it will be seen that its front, the portion represented as facing the observer of FIG. 2, faces the sun 49 so that main batteries 20, 22, 24 and 25 would be exposed to the sun 49; and if the orbital direction of rotation is that represented by curved arrow 72, the satellite 50 may be described as backing away from the sun 49. Continuation of such motion brings the satellite to the position of satellite 52; which is just crossing the umbral line 68. The bottom of satellite 52 is exposed to the sun 49, so that main batteries 24 and 25 (per FIG. 2) will be fully exposed to it. Entry into the shadow of the earth 48 brings the satellite to the position of satellite 54, which still faces backward. Any random yawing will thus cause no trouble; the pitch and roll orientation will not be disturbed, since it will be determined by the gravity gradient rod (16 of FIG. 2) and damped by the damper (18 of FIG. 2). As the satellite progresses still further in its orbit, it reaches the position of satellite 56, which is just crossing the umbral line 70 into the sunlight. Now the back 76 of satellite 56 will be illuminated and the back solar battery (such as 30 of FIG. 1) will be illuminated, driving the pump (such as 28 of FIG. 1) and causing the fluid in the fluid flywheel (such as 26 of FIG. 1) to circulate and rotate the satellite around its yaw axis, so that by the time it has moved to the position of satellite 58 it has made half a circle of rotation. Satellite 58, it may be seen, faces the sun and moves forward to occupy successively the positions of satellites 60 and 62. When a satellite has reached the position of satellite 64, slightly past the position at which the sun is at zenith, its back 78 will be illuminated, illuminating its back solar battery (such as 30 of FIG. 1) and causing it to rotate another half circle in the fashion previously described with respect to satellite 56. Thus, by the time the satellite 64 has moved to the position of satellite 66, it is facing the sun and backing away from it toward the position of satellite 50.

It is evident from the foregoing description of FIG. 5 that our invention is particularly useful in application to satellites which pass through the earth's shadow in their orbits. However, even in an orbit which does not pass through the earth's shadow, the use of our invention will provide rapid orientation of the satellite from a backward-facing attitude toward the sun if it assumes such an attitude from some accidental cause; the cost of such provision is only a single additional solar battery.

Our invention has been described in terms of its preferred embodiment. Its breadth, recognizable to those skilled in the art, may be made more clear by pointing out the generic identity of the elements which, for simplicity of explanation, we have described in narrower terms. Thus, the fluid flywheel 26 is more generally angular momentum storage means, operable in either of two directions or senses. "Rod" 16 constitutes means for orientation with respect to the local vertical, and damper 18 constitutes means for stabilization with respect to the same. Solar pressure panels 14 may also be described as radiation pressure orientation means or solar pressure means or solar pressure orientation means. Solar batteries 32, 34 and 36, 38 are radiation sensors and, functioning with overhangs 40 and 42, are displacement sensing means. Overhangs 40 and 42 serve simply as shades; but it is evident that they may be replaced by a variety of more elaborate lens, prism or other similar devices, all of which are radiation control means. Similarly, back solar battery 30 is more generally back radiation sensing means, or reversal sensing means (since it senses that the vehicle has actually reversed its attitude toward the sun). Solar batteries 32, 34 and 36, 38 function when the vehicle is displaced by less than a quadrant (in yaw, in the particular embodiment described) from its oriented attitude toward the sun; and when the displacement exceeds a quadrant but is less than three quadrants, the back battery 30 is illuminated. It is evident from our description and explanation that means other than those we have disclosed, but coming within the broader or more general descriptions we have here offered, will function effectively in carrying out our invention.

The claims hereinafter are written in subparagraph form, for easier reading, and the resulting subdivision into subparagraphs does not reflect any necessary relative importance or mutual relationship of the elements therein recited.

What is claimed is:

1. A space vehicle having:
   a front portion and a back portion;
   radiation pressure orientation means providing torques around an axis to cause the front portion to face the source of the said radiation;
   angular momentum storage means operative to store momentum of either sense around the said axis, responsively to ambient radiation which also impinges upon the said front portion at an acute angle, measured in a plane normal to the said axis, with the breadth of the vehicle;
   means to receive radiation impinging upon the said back portion, connected to said angular momentum storage means to cause it to store angular momentum of only one said sense.

2. A space vehicle provided with:
   means for orientation and stabilization with respect to the local vertical;
   solar-pressure means for orientation in yaw with respect to the sun;
   angular momentum storage means for storage of angular momentum about the yaw axis;
   solar radiation sensors connected to operate the said angular momentum storage means in either of two directions responsively to the illumination of less than all of the said solar radiation sensors;
   radiation control means operative to selectively prevent illumination of some but less than all of the said sensors when the said satellite is displaced in yaw less than a quadrant and more than zero from its stable orientation to the sun;
   back radiation sensing means located on the said vehicle to be illuminated when the vehicle is displaced in yaw more than a quadrant and less than three quadrants from its stable orientation to the sun and connected to operate the said angular momentum storage means in one only of the said two directions, responsively to illumination of the said back radiation sensing means.

3. A space vehicle provided with:
   solar pressure orientation means;
   a fluid flywheel driven by
   a plurality of first solar batteries
      connected in polar opposition to drive the said flywheel, and
      located symmetrically with respect to the center of solar pressure upon the said orientation means;
   shade means to shade the said first solar batteries when the said vehicle is oriented with respect to the sun, and to shade some but not all of the said solar batteries when the said vehicle is displaced from orientation to the sun by less than a quadrant;
   back solar battery means connected in polar opposition to one of said first solar batteries, and
      located upon the said vehicle to be illuminated when the said vehicle is displaced from orientation to the sun by more than a quadrant and less than three quadrants.

4. In a space vehicle provided with:
   means for orientation and stabilization with respect to the local vertical;
   solar-pressure means for orientation in yaw with respect to the sun;
   angular momentum storage means for storage of angular momentum about the yaw axis;
   solar radiation sensors connected to operate the said angular momentum storage means in either of two directions responsively to the illumination of less than all of the said solar radiation sensors;
   radiation control means operative to selectively prevent illumination of some but less than all of the said sensors when the said satellite is displaced in yaw less than a quadrant and more than zero from its stable orientation to the sun;
   the improvement comprising:
   back radiation sensing means located on the said vehicle to be illuminated when the vehicle is displaced in yaw more than a quadrant and less than three quadrants from its stable orientation to the sun and connected to operate the said angular momentum storage means in one only of the said two directions, responsively to illumination of the said back radiation sensing means.

References Cited by the Examiner

UNITED STATES PATENTS 3,116,035   12/1963   Cutler _____ 244—1

FERGUS S. MIDDLETON, *Primary Examiner.*